(12) United States Patent
Apap et al.

(10) Patent No.: US 7,913,306 B2
(45) Date of Patent: *Mar. 22, 2011

(54) SYSTEM AND METHODS FOR DETECTING INTRUSIONS IN A COMPUTER SYSTEM BY MONITORING OPERATING SYSTEM REGISTRY ACCESSES

(75) Inventors: Frank Apap, Valley Stream, NY (US); Andrew Honig, East Windsor, NJ (US); Hershkop Shlomo, Brooklyn, NY (US); Eleazar Eskin, Santa Monica, CA (US); Salvatore J. Stolfo, Ridgewood, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 214 days.

This patent is subject to a terminal disclaimer.

(21) Appl. No.: 12/154,405

(22) Filed: May 21, 2008

(65) Prior Publication Data

US 2009/0083855 A1 Mar. 26, 2009

Related U.S. Application Data

(63) Continuation of application No. 10/352,343, filed on Jan. 27, 2003, now Pat. No. 7,448,084.

(60) Provisional application No. 60/351,857, filed on Jan. 25, 2002.

(51) Int. Cl.
G06F 21/22 (2006.01)
G06F 11/30 (2006.01)

(52) U.S. Cl. ............................................. 726/24; 726/22
(58) Field of Classification Search .................... None
See application file for complete search history.

(56) References Cited

U.S. PATENT DOCUMENTS

| 6,647,400 | B1 | 11/2003 | Moran |
| 6,742,124 | B1 | 5/2004 | Kilpatrick et al. |
| 6,907,430 | B2 | 6/2005 | Chong et al. |
| 7,162,741 | B2 | 1/2007 | Eskin et al. |
| 7,225,343 | B1 | 5/2007 | Honig et al. |
| 7,509,679 | B2 * | 3/2009 | Alagna et al. .................. 726/24 |

(Continued)

OTHER PUBLICATIONS

U.S. Appl. No. 10/327,811, filed Dec. 19, 2002 claiming priority to U.S. Appl. No. 60/342,872, filed Dec. 20, 2001, entitled "System And Methods for Detecting a Denial-Of-Service Attack On A Computer System" of Salvatore J. Stolfo, Shlomo Hershkop, Rahul Bhan, Suhail Mohiuddin and Eleazar Eskin. (AP34898).

(Continued)

*Primary Examiner* — Christopher A Revak
(74) *Attorney, Agent, or Firm* — Baker Botts LLP (57) ABSTRACT

A method for detecting intrusions in the operation of a computer system is disclosed which comprises gathering features from records of normal processes that access the files system of the computer, such as the Windows registry, and generating a probabilistic model of normal computer system usage based on occurrences of said features. The features of a record of a process that accesses the Windows registry are analyzed to determine whether said access to the Windows registry is an anomaly. A system is disclosed, comprising a registry auditing module configured to gather records regarding processes that access the Windows registry; a model generator configured to generate a probabilistic model of normal computer system usage based on records of a plurality of processes that access the Windows registry and that are indicative of normal computer system usage; and a model comparator configured to determine whether the access of the Windows registry is an anomaly.

11 Claims, 3 Drawing Sheets

U.S. PATENT DOCUMENTS

| | | | |
|---|---|---|---|
| 2003/0065926 A1 | 4/2003 | Schultz et al. | |
| 2003/0167402 A1 | 9/2003 | Stolfo et al. | |
| 2004/0098607 A1* | 5/2004 | Alagna et al. | 713/200 |
| 2004/0187023 A1* | 9/2004 | Alagna et al. | 713/200 |
| 2006/0075492 A1* | 4/2006 | Golan et al. | 726/22 |
| 2006/0174319 A1 | 8/2006 | Kraemer et al. | |
| 2009/0089040 A1* | 4/2009 | Monastyrsky et al. | 703/26 |
| 2009/0288161 A1* | 11/2009 | Wei et al. | 726/22 |
| 2009/0313699 A1* | 12/2009 | Jang et al. | 726/23 |
| 2010/0095379 A1* | 4/2010 | Obrecht et al. | 726/23 |

OTHER PUBLICATIONS

U.S. Appl. No. 10/320,259, filed Dec. 16, 2002 claiming priority to U.S. Appl. No. 60/328,682, filed Oct. 11, 2001 and U.S. Appl. No. 60/352,894, filed Jan. 29, 2002, entitled "Methods of Unsupervised Anomaly Detection Using a Geometric Framework" of Eleazar Eskin, Salvatore J. Stolfo and Leonid Portnoy. (AP34888).

U.S. Appl. No. 10/269,718, filed Oct. 11, 2002 claiming priority to U.S. Appl. No. 60/328,682, filed Oct. 11, 2001 and U.S. Appl. No. 60/340,198, filed Dec. 14, 2001, entitled "Methods for Cost-Sensitive Modeling for Intrusion Detection" of Salvatore J. Stolfo, Wenke Lee, Wei Fan and Matthew Miller. (AP34885).

U.S. Appl. No. 10/269,694, filed Oct. 11, 2002 claiming priority to U.S. Appl. No. 60/328,682, filed Oct. 11, 2001 and U.S. Appl. No. 60/339,952, filed Dec. 13, 2001, entitled "System and Methods for Anomaly Detection and Adaptive Learning" of Wei Fan, Salvatore J. Stolfo. (AP34886).

Lee et al., "A Framework for Constructing Features and Models for Intrusion Detection Systems," Nov. 2000, ACM Transactions on Information and System Security, vol. 3, No. 4, p. 22.

Eskin et al., "Adaptive Model Generation for Intrusion Detection Systems," Workshop on Intrusion Detection and Prevention, 7th ACM Conference on Computer Security, Athens, Nov. 20000.

Korba, "Windows NT Attacks for the Evaluation of Intrusion Detection Systems," May 2000.

Honig A et al., (2002) "Adaptive model generation: An Architecture for the deployment of data mining-based intrusion detection systems." In *Data Mining for Security Applications. Kluwer*.

Friedman N et al., (1999) "Efficient bayesian parameter estimation in large discrete domains." Advances in Neural Information Processing Systems 11.

Javits HS et al., Mar. 7, 1994, "The nides statistical component: Description and justification." *Technical report, SRI International*.

D. E. Denning, An Intrusion Detection Model, *IEEE Transactions on Software Engineering*, SE-13:222-232, 1987.

Wenke Lee, Sal Stolfo, and Kui Mok. "Mining in a Data-flow Environment: Experience in Network Intrusion Detection" *In Proceedings of the 5th ACM SIGKDD International Conference on Knowledge Discovery & Data Mining (KDD '99)*, San Diego, CA, Aug. 1999.

Stephanie Forrest, S. A. Hofmeyr, A. Somayaji, and T. A. Longstaff, "A Sense of Self for UNIX Processes," *IEEE Computer Society*, pp. 120-128, 1996.

Christina Warrender, Stephanie Forrest, and Barak Pearlmutter, "Detecting Intrusions Using System Calls: Alternative Data Models," *IEEE Computer Society*, pp. 133-145, 1999.

S. A. Hofmeyr, Stephanie Forrest, and A. Somayaji, "Intrusion Detect Using Sequences of System Calls," *Journal of Computer Security*, 6:151-180, 1998.

W. Lee, S. J. Stolfo, and P. K. Chan, "Learning Patterns from UNIX Processes Execution Traces for Intrusion Detection," AAAI Press, pp. 50-56, 1997.

Eleazar Eskin, "Anomaly Detection Over Noisy Data Using Learned Probability Distributions," *Proceedings of the Seventeenth International Conference on Machine Learning (ICML-2000)*, 2000.

N. Friedman and Y. Singer, "Efficient Bayesian Parameter Estimation in Large Discrete Domains," *Advances in Neural Information Processing Systems 11*, MIT Press, 1999.

M. Mahoney and P. Chan, "Detecting Novel Attacks by Identifying Anomalous Network Packet Headers," *Technical Report CS-2001-2*, Florida Institute of Technology, Melbourne, FL, 2001.

H. Debar et al., "Intrusion Detection Exchange Format Data Model," Internet Engineering Task Force, Jun. 15, 2000.

* cited by examiner

SYSTEM AND METHODS FOR DETECTING INTRUSIONS IN A COMPUTER SYSTEM BY MONITORING OPERATING SYSTEM REGISTRY ACCESSES

CROSS-REFERENCE TO RELATED APPLICATIONS

This application is a continuation of U.S. patent application Ser. No. 10/352,343, filed on Jan. 27, 2003, which is now U.S. Pat. No. 7,448,084, and which claims the benefit of U.S. Provisional Patent Application Ser. No. 60/351,857, filed on Jan. 25, 2002, each of which is incorporated by reference in its entirety herein.

STATEMENT REGARDING FEDERALLY SPONSORED RESEARCH OR DEVELOPMENT

This invention was made with government support under grant nos. FAS-526617, SRTSC-CU019-7950-1, and F30602-00-1-0603 awarded by the United States Defense Advanced Research Projects Agency (DARPA). The government has certain rights in the invention.

COMPUTER PROGRAM LISTING

A computer program listing is submitted in duplicate on CD. Each CD contains a routines listed in the Appendix, which CD was created on May 20, 2008, and which is 22 MB in size. The files on this CD are incorporated by reference in their entirety herein.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

This invention relates to systems and methods for detecting anomalies in a computer system, and more particularly to the use of probabilistic and statistical models to model the behavior of processes which access the file system of the computer, such as the Windows™ registry.

2. Background

Windows™ is currently one of the most widely used operating systems, and consequently computer systems running the Windows™ operating system are frequently subject to attacks. Malicious software is often used to perpetrate these attacks. Two conventional approaches to respond to malicious software include virus scanners, which attempt to detect the malicious software, and security patches that are created to repair the security "hole" in the operating system that the malicious software has been found to exploit. Both of these methods for protecting hosts against malicious software suffer from drawbacks. While they may be effective against known attacks, they are unable to detect and prevent new and previously unseen types of malicious software.

Many virus scanners are signature-based, which generally means that they use byte sequences or embedded strings in software to identify certain programs as malicious. If a virus scanner's signature database does not contain a signature for a malicious program, the virus scanner is unable to detect or protect against that malicious program. In general, virus scanners require frequent updating of signature databases, otherwise the scanners become useless to detect new attacks. Similarly, security patches protect systems only when they have been written, distributed and applied to host systems in response to known attacks. Until then, systems remain vulnerable and attacks are potentially able to spread widely.

Frequent updates of virus scanner signature databases and security patches are necessary to protect computer systems using these approaches to defend against attacks. If these updates do not occur on a timely basis, these systems remain vulnerable to very damaging attacks caused by malicious software. Even in environments where updates are frequent and timely, the systems are inherently vulnerable from the time new malicious software is created until the software is discovered, new signatures and patches are created, and ultimately distributed to the vulnerable systems. Since malicious software may be propagated through email, the malicious software may reach the vulnerable systems long before the updates are in place.

Another approach is the use of intrusion detection systems (IDS). Host-based IDS systems monitor a host system and attempt to detect an intrusion. In an ideal case, an IDS can detect the effects or behavior of malicious software rather than distinct signatures of that software. In practice, many of the commercial IDS systems that are in widespread use are signature-based algorithms, having the drawbacks discussed above. Typically, these algorithms match host activity to a database of signatures which correspond to known attacks. This approach, like virus detection algorithms, requires previous knowledge of an attack and is rarely effective on new attacks. However, recently there has been growing interest in the use of data mining techniques, such as anomaly detection, in IDS systems. Anomaly detection algorithms may build models of normal behavior in order to detect behavior that deviates from normal behavior and which may correspond to an attack. One important advantage of anomaly detection is that it may detect new attacks, and consequently may be an effective defense against new malicious software. Anomaly detection algorithms have been applied to network intrusion detection (see, e.g., D. E. Denning, "An Intrusion Detection Model, *IEEE Transactions on Software Engineering*, SE-13: 222-232, 1987; H. S. Javitz and A. Valdes, "The NIDES Statistical Component: Description and Justification, *Technical report, SRI International,* 1993; and W. Lee, S. J. Stolfo, and K. Mok, "Data Mining in Work Flow Environments: Experiences in Intrusion Detection," *Proceedings of the 1999 Conference on Knowledge Discovery and Data Mining (KDD-99),* 1999) and also to the analysis of system calls for host based intrusion detection (see, e.g., Stephanie Forrest, S. A. Hofmeyr, A. Somayaji, and T. A. Longstaff, "A Sense of Self for UNIX Processes," *IEEE Computer Society*, pp. 120-128, 1996; Christina Warrender, Stephanie Forrest, and Barak Pearlmutter, "Detecting Intrusions Using System Calls: Alternative Data Models," *IEEE Computer Society*, pp. 133-145, 1999; S. A. Hofmeyr, Stephanie Forrest, and A. Somayaji, "Intrusion Detect Using Sequences of System Calls," *Journal of Computer Security,* 6:151-180, 1998; W. Lee, S. J. Stolfo, and P. K. Chan, "Learning Patterns from UNIX Processes Execution Traces for Intrusion Detection," AAAI Press, pp. 50-56, 1997; and Eleazar Eskin, "Anomaly Detection Over Noisy Data Using Learned Probability Distributions," *Proceedings of the Seventeenth International Conference on Machine Learning (ICML-2000),* 2000).

There are drawbacks to the prior art approaches. For example, the system call approach to host-based intrusion detection has several disadvantages which inhibit its use in actual deployments. A first is that the computational overhead of monitoring all system calls is potentially very high, which may degrade the performance of a system. A second is that system calls themselves are typically irregular by nature. Consequently, it is difficult to differentiate between normal and malicious behavior, and such difficulty to differentiate behavior may result in a high false positive rate.

Accordingly, there is a need in the art for an intrusion detection system which overcomes these limitations of the prior art.

SUMMARY OF THE INVENTION

It is an object of the invention to provide techniques which are effective in detecting attacks while maintaining a low rate of false alarms.

It is another object of the invention to generate a model of the normal access to the Windows registry, and to detect anomalous accesses to the registry that are indicative of attacks.

These and other aspects of the invention are realized by a method for detecting intrusions in the operation of a computer system comprising the steps of gathering features from records of normal processes that access the Windows registry. Another step comprises generating a probabilistic model of normal computer system usage, e.g., free of attacks, based on occurrences of said features. The features of a record of a process that accesses the Windows registry are analyzed to determine whether said access to the Windows registry is an anomaly.

According to an exemplary embodiment, the step of gathering features from the records of normal processes that access the Windows registry may comprise gathering a feature corresponding to a name of a process that accesses the registry. Another feature may correspond to the type of query being sent to the registry. A further feature may correspond to an outcome of a query being sent to the registry. A still further feature may correspond to a name of a key being accessed in the registry. Yet another feature may correspond to a value of said key being accessed. In addition, any other features may be combined to detect anomalous behavior that may not be identified by analyzing a single feature.

The step of generating a probabilistic model of normal computer system usage may comprise determining a likelihood of observing a feature in the records of processes that access the Windows registry. This may comprise performing consistency checks. For example, a first order consistency check may comprise determining the probability of observation of a given feature. The step of determining a likelihood of observing a feature may comprise a second order consistency check, e.g., determining a conditional probability of observing a first feature in said records of processes that access the Windows registry given an occurrence of a second feature is said records.

In the preferred embodiment, the step of analyzing a record of a process that accesses the Windows registry may comprise, for each feature, determining if a value of the feature has been previously observed for the feature. If the value of the feature has not been observed, then a score may be determined based on a probability of observing said value of the feature. If the score is greater than a predetermined threshold, the method comprises labeling the access to the Windows registry as anomalous and labeling the process that accessed the Windows registry as malicious.

A system for detecting intrusions in the operation of a computer system has an architecture which may comprise a registry auditing module, e.g., a sensor, configured to gather records regarding processes that access the Windows registry. A model generator is also provided which is configured to generate a probabilistic model of normal computer system usage based on records of a plurality of processes that access the Windows registry and that are indicative of normal computer system usage, e.g., free of attacks. A model comparator, e.g., anomaly detector, is configured to receive said probabilistic model of normal computer system usage and to receive records regarding processes that access the Windows registry and to determine whether the access of the Windows registry is an anomaly.

The system may also comprise a database configured to receive records regarding processes that access the Windows registry from said registry auditing module. The model generator may be configured to receive the records regarding processes that access the Windows registry from the database.

The model generator may be configured to determine a conditional probability of observing a first feature in records regarding processes that access the Windows registry given an occurrence of a second feature is said record. The model comparator may be configured to determine a score based on the likelihood of observing a feature in a record regarding a process that accesses the Windows registry. The model comparator may also be configured to determine whether an access to the Windows registry is anomalous based on whether the score exceeds a predetermined threshold.

In accordance with the invention, the objects as described above have been met, and the need in the art for detecting intrusions based on registry accesses has been satisfied.

BRIEF DESCRIPTION OF THE DRAWINGS

Further objects, features, and advantages of the invention will become apparent from the following detailed description taken in conjunction with the accompanying figures showing illustrative embodiments of the invention, in which.

Throughout the figures, the same reference numerals and characters, unless otherwise stated, are used to denote like features, elements, components, or portions of the illustrated embodiments. Moreover, while the subject invention will now be described in detail with reference to the figures, it is done so in connection with the illustrative embodiments without departing from the true scope and spirit of the invention as defined by the appended claims.

DETAILED DESCRIPTION OF THE EXEMPLARY EMBODIMENTS

Figure 1:
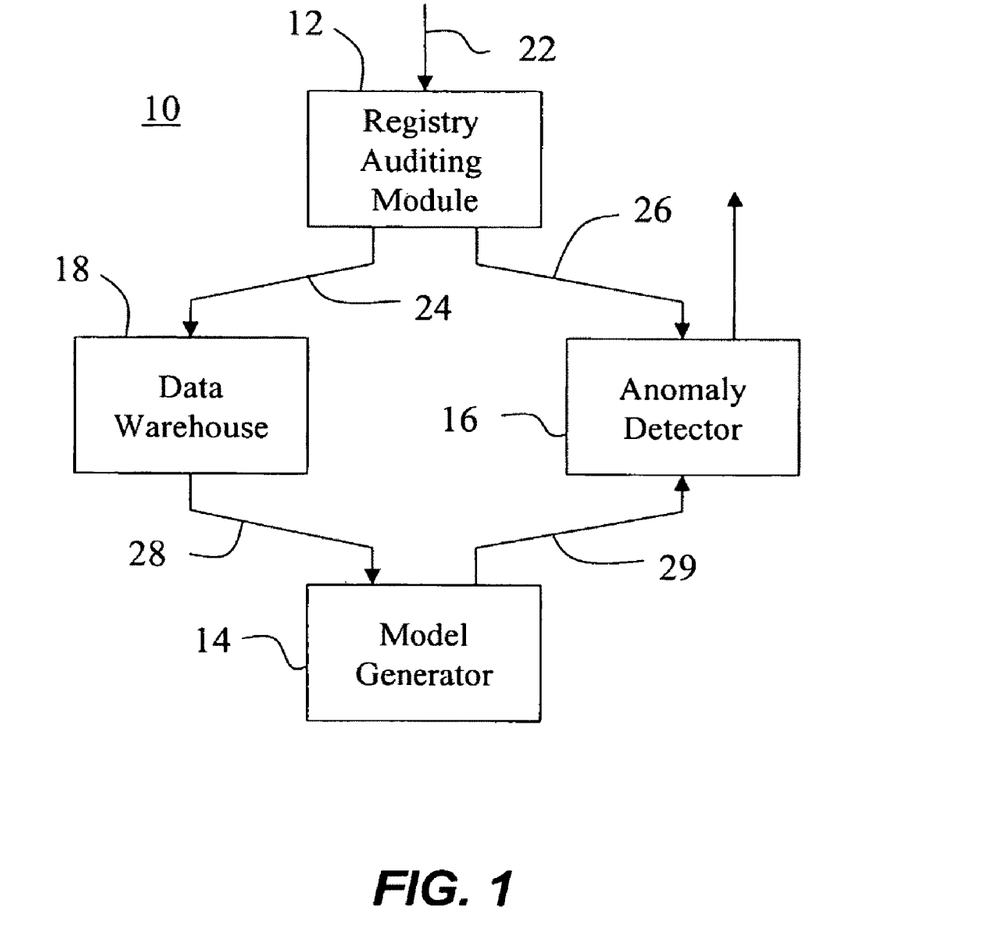
FIG. 1 is a block diagram illustrating the architecture of the system in accordance with the present invention.

A novel intrusion detection system 10 is disclosed herein and illustrated in FIG. 1. System 10 monitors a program's access of the file system of the computer, e.g., Microsoft™ Windows™ registry (hereinafter referred to as the "Windows™ registry" or the "registry") and determines whether the program is malicious. The system and methods described herein incorporate a novel technique referred to herein as "RAD" (Registry Anomaly Detection), which monitors the accesses to the registry, preferably in real time, and detects the actions of malicious software.

As is known in the art, the registry is an important component of the Windows™ operating system and is implemented very widely. Accordingly, a substantial amount of data regarding activity associated with the registry is available. The novel technique includes building a sensor, e.g., registry auditing module, on the registry and applying the information gathered by this sensor to an anomaly detector. Consequently, registry activity that corresponds to malicious software may be detected. Several advantages of monitoring the registry include the fact that registry activity is regular by nature, that the registry can be monitored with low computational overhead, and that almost all system activities query the registry.

An exemplary embodiment of the novel system, e.g., system 10, comprises several components: a registry auditing module 12, a model generator 14, and an anomaly detector 16. Generally, the sensor 12 serves to output data for each registry activity to a database 18 where it is stored for training. The model generator 14 reads data from the database 18, and creates a model of normal behavior. The model is then used by the anomaly detector 16 to decide whether each new registry access should be considered anomalous. The above components can reside on the host system itself, or on a remote network connected to the host.

A description of the Windows™ registry is provided herein. As is known in the art, the registry is a database of information about a computer's configuration. The registry contains information that is continually referenced by many different programs during the operation of the computer system. The registry may store information concerning the hardware installed on the system, the ports that are being used, profiles for each user, configuration settings for programs, and many other parameters of the system. The registry is the main storage location for all configuration information for almost all programs. The registry is also the storage location for all security information such as security policies, user names, and passwords. The registry also stores much of the important configuration information that are needed by programs in order to run.

The registry is organized hierarchically as a tree. Each entry in the registry is called a "key" and has an associated value. One example of a registry key is:

---
HKCU\Software\America Online\AOL Instant Messenger (TM)\CurrentVersion\Users\aimuser\Login\Password

---

This example represents a key used by the AOL™ Instant Messenger™ program. This key stores an encrypted version of the password for the user name "aimuser." Upon execution, the AOL™ Instant Messenger™ program access the registry. In particular, the program queries this key in the registry in order to retrieve the stored password for the local user. Information is accessed from the registry by individual registry accesses or queries. The information associated with a registry query may include the key, the type of query, the result, the process that generated the query, and whether the query was successful. One example of a query is a read for the key, shown above. For example, the record of the query is:

Process: aim.exe
Query: Queryvalue
Key: HKCU\Software\America Online\AOL Instant Messenger(™)\CurrentVersion\Users\aimuser\Login\Password
Response: SUCCESS
ResultValue: "BCOFHIHBBAHF"

The registry serves as an effective data source to monitor for attacks because it has been found that many attacks are manifested as anomalous registry behavior. For example, certain attacks have been found to take advantage of Windows'™ reliance on the registry. Indeed, many attacks themselves rely on the registry in order to function properly. Many programs store important information in the registry, despite the fact that any other program can likewise access data anywhere inside the registry. Consequently, some attacks target the registry to take advantage of this access. In order to address this concern, security permissions are included in some versions of Windows™. However, such permissions are not included in all versions of Windows™, and even when they are included, many common applications do not make use of this security feature.

"Normal" computer usage with respect to the registry is described herein. Most typical Windows™ programs access a certain set of keys during execution. Furthermore, each user typically uses a certain set of programs routinely while running their machine. This set of programs may be a set of all programs installed on the machine, or a small subset of these programs.

Another important characteristic of normal registry activity is that it has been found to be substantially regular over time. Most programs may either (1) access the registry only on startup and shutdown, or (2) access the registry at specific intervals. Since this access to the registry appears to be substantially regular, monitoring the registry for anomalous activity provides useful results because a program which substantially deviates from this normal activity may be easily detected as anomalous.

Other normal registry activity occurs only when the operating system is installed by the manufacturer. Some attacks involve launching programs that have not been launched before and/or changing keys that have not been changed since the operating system was first installed by the manufacturer.

If a model of the normal registry behavior is trained over clean data, then these kinds of registry operations will not appear in the model, and can be detected when they occur. Furthermore, malicious programs may need to query parts of the registry to get information about vulnerabilities. A malicious program can also introduce new keys that will help create vulnerabilities in the machine.

Some examples of malicious programs and how they produce anomalous registry activity are as follows:

Setup Trojan: This program, when launched, adds full read/write sharing access on the file system of the host machine. It makes use of the registry by creating a registry structure in the networking section of the Windows™ keys. The structure stems from HKLM\Software\Microsoft\Windows\CurrentVersion\Network\LanMan. It then makes several, e.g., eight, new keys for its use. It also accesses HKLM\Security\Provider in order to find information about the security of the machine to help determine vulnerabilities. This key is not accessed by any normal programs during training or testing in our experiments, and therefore its use is clearly suspicious in nature.

Back Oriffice 2000: This program opens a vulnerability on a host machine, which may grant anyone with the back oriffice client program complete control over the host machine. This program makes extensive use of the registry. In doing so, it does access a key that is very rarely accessed on the Windows™ system. This key, HKLM\Software\Microsoft\VBA\Monitors, was not accessed by any normal programs in either the training or test data. Accordingly, the detection algorithm was able to determine it as anomalous. This program also launches many other programs (e.g., LoadWC.exe, Patch.exe, runonce.exe, bo2k_i_o_intl.e) as part of the attack, in which all of these programs made anomalous accesses to the registry.

Aimrecover: This program obtains passwords from AOL™ users without authorization. It is a simple program that reads the keys from the registry where the AOL™ Instant Messenger™ program stores the user names and passwords. These accesses are considered anomalous because Aimrecover is accessing a key that usually is accessed and was created by a different program.

Disable Norton: This is a simple exploitation of the registry that disables Norton™ Antivirus. This attack toggles one record in the registry, in particular, the key HKLM\SOFTWARE\INTEL\LANDesk\Virusprotect6\CurrentVersion\Storages\Files\System\RealTimeScan\OnOff. If this value is set to 0, then Norton™ Antivirus real-time system monitoring is turned off. Again, this is considered anomalous because of its access to a key that was created by a different program.

L0phtCrack: This program is a widely used password cracking program for Windows™ machines. It obtains the hashed SAM file containing the passwords for all users, and then uses either a dictionary or a brute force approach to find the passwords. This program also uses flaws in the Windows™ encryption scheme in order to try to find some of the characters in a password in order to obtain a password faster. This program uses the registry by creating its own section in the registry. This new section may include many create key and set value queries, all of which will be on keys that did not exist previously on the host machine and therefore have not been seen before.

An additional aspect of normal computer usage of the registry is described herein. During testing (as will be described below) all of the programs observed in the data set cause Explorer™ to access a key specifically for that application. This key has the following format:

HKLM\Software\Microsoft\WindowsNT \CurrentVersion\Image File Execution Options\[processName]

where "processName" is the name of the process being run. (It is believed that all programs in general have this behavior.) This key is accessed by Explorer™ each time an application is run. Given this information, a detection system may be able to determine when new applications are run, which will be a starting point to determine malicious activity. In addition, many programs add themselves in the auto-run section of the registry under the following key:

HKLM\Software\Microsoft\Windows\CurrentVersion\Run.

While this activity is not malicious in nature, it is nevertheless an uncommon event that may suggest that a system is being attacked. Trojans such as Back Orifice utilize this part of the registry to auto load themselves on each boot.

Anomaly detectors, such as anomaly detector 16, do not operate by looking for malicious activity directly. Rather, they look for deviations from normal activity. Consequently, such deviations, which represent normal operation, may nevertheless be declared an attack by the system. For example, the installation of a new program on a system may be viewed as anomalous activity by the anomaly detector, in which new sections of the registry and many new keys may be created. This activity may interpreted as malicious (since this activity was not in the training data) and a false alarm may be triggered, much like the process of adding a new machine to a network may cause an alarm on an anomaly detector that analyzes network traffic.

There are a few possible solutions to avoid this problem. Malicious programs often install quietly so that the user does not know the program is being installed. This is not the case with most installations. For example, in an exemplary embodiment, the algorithm is programmed to ignore alarms while the install shield program is running, because the user would be aware that a new program is being installed (as opposed to malicious activity occurring without the users knowledge and permission). In another embodiment, the user is prompted when a detection occurs, which provides the user with the option of informing the algorithm that the detected program is not malicious and therefore grants permission for such program to be added to the training set of data to update the anomaly detector for permissible software.

In order to detect anomalous registry accesses, model generator 14 of system 10 generates a model of normal registry activity. A set of five basic features are extracted from each registry access. (An additional five features may be added, which are combinations of the five basic features, as described below.) Statistics of the values of these features over normal data are used to create the probabilistic model of normal registry behavior. This model of normal registry behavior may include a set of consistency checks applied to the features, as will be described below. When detecting anomalies, the model of normal behavior is used to determine whether the values of the features of the new registry accesses are consistent with the normal data. If such values are not consistent, the algorithm labels the registry access as anomalous, and the processes that accessed the registry as malicious.

In the exemplary embodiment, the data model consists of five basic features gathered by the registry auditing module 12 from an audit stream. (It is contemplated that additional features may also provide significant results.) In the exemplary embodiment, the features are as follows:

Process: The name of the process accessing the registry. This allows the tracking of new processes that did not appear in the training data.

Query: The type of query being sent to the registry, for example, QueryValue, CreateKey, and SetValue are valid query types. This allows the identification of query types that have not been seen before. There are many query types but only a few are used under normal circumstances.

Key: The actual key being accessed. Including this feature allows the algorithm to locate keys that are never accessed in the training data. Many keys are used only once for special situations like system installation. Some of these keys can be used by attacks to create vulnerabilities.

Response: A feature which describes the outcome of the query, for example, success, not found, no more, buffer overflow, and access denied.

Result Value: The value of the key being accessed. Including this feature allows the algorithm to detect abnormal values being used to create abnormal behavior in the system.

Composite features may also be used, which are a combination of two basic features, such as those discussed above. These composite features are useful in detecting anomalies since they allow the system to give more detail to its normal usage model where the existence of the basic features in isolation would not necessary be detected as anomalous. The following is a list of exemplary composite fields that may be used by system 10:

Process/Query: This key is a combination of the process and query fields, and may provide information to determine if a particular process is executing queries that are not typically executed by this process.

Key/Process: This key is a combination of the key and process fields, and may allow the algorithm to detect whether or not a process accesses portions of the registry it typically doesn't access. Also it detects when a key is being accessed by a process that normally doesn't access it. This analysis is very useful because many processes access keys belonging to other programs, and this field would allow the detection of such an event.

Query/Key: This key is a combination of the query and key fields, and may determine if a key is being accessed in a different way than usual. For example, there are many key values in the registry that are written once at the time of their creation, and then are subsequently read from the registry without change. Some of these keys store crucial information for the execution of certain programs. If a malicious process were to write to one of these keys, after the time of their creation, this field would enable the algorithm to detect such an event, and the record would appear anomalous.

Response/Key: This key is a combination of the key and response fields. Many keys are found to be used in the same manner each time they are used. Consequently, they will always return the same response. Since a different response to a key may be indicative of abnormal or malicious system activity, the algorithm which utilizes this combination key would be able to detect such abnormal or malicious activity.

Result Value/Key: This key is a combination of the key and result value. During operation of the computer system, many keys will always contain a value from a certain set or range of values. When the value is outside that range, that could be an indicator of a malicious program taking advantage of a vulnerability.

As an illustration, an exemplary registry access is displayed in Table 1. The second column is normal access by the process aim.exe (which is used with AOL™ Instant Messenger™) to access the key where passwords are stored. The third column of Table 1 is a malicious access by a process aimrecover.exe to the same key. The final column of Table 1 shows which fields register by the anomaly detector as anomalous. As seen in the table, all of the basic features, e.g., process, query, key, response, and result value, do not appear anomalous for the normal process aim.exe, when compared with the malicious process aimrecover.exe. However, the composite keys are useful for detecting the anomalous behavior of aimrecover.exe. For example, the fact that the process aimrecover.exe is accessing a key that is usually associated with another process, i.e., aim.exe, is detected as an anomaly. This conclusion is made because under normal circumstances only aim.exe accesses the key that stores the AOL™ Instant Messenger™ password. The occurrence of another process accessing this key is considered suspicious. By examining the combination of two basic features, the algorithm can detect this anomaly.

Exemplary embodiments of intrusion detection algorithms which may be used by the system 10 will now be described, although it is understood that other anomaly detection algorithms may also be used in connection with the present invention. Since a significant amount of data is monitored in real time, the algorithm that is selected must be very efficient. According to a first exemplary embodiment, the features that were monitored from each registry access are used to train a model over features extracted from normal data. That model allows for the classification of registry accesses as either normal or malicious, as will be described herein.

In general, a principled probabilistic approach to anomaly detection can be reduced to density estimation. If a density function p(x) can be estimated over the normal data, anomalies are defined as data elements that occur with low probability. In practice, estimating densities is a very complex, non-trivial problem. In detecting intrusions into the registry, a complication is that each of the features have many possible values. For example, the key feature, defined above, may have over 30,000 values in the training set. Since there are so many possible feature values, it is relatively rare that the same exact record occurs more than once in the data. Data sets of this type are referred to as "sparse."

Since probability density estimation is a very complex problem over sparse data, the method of the present invention defines a set of consistency checks over the normal data for determining which records from a sparse data set are anomalous. Each consistency check is applied to an observed record by the anomaly detector. If the record fails any consistency check, the record is labeled as anomalous.

In the exemplary embodiment, two kinds of consistency checks are applied. The first consistency check evaluates whether or not a feature value is consistent with observed values of that feature in the normal data set. This type of consistency check is referred to as a first order consistency check, e.g., each registry record may be viewed as the outcome of five random variables, one for each feature, $X_1$, $X_2$, $X_3$, $X_4$, $X_5$. The consistency checks compute the likelihood of an observation of a given feature denoted as $P(X_i)$.

The second consistency check handles pairs of features, as discussed in the example in Table 1. For each pair of features, the conditional probability of a feature value given another feature value is considered. These consistency checks are referred to as second order consistency checks. These likelihoods are denoted as $P(X_i|X_j)$. For each value of $X_j$, there may be a different probability distribution over $X_i$.

TABLE 1

| Feature | aim.exe | aimreoover.exe | Anomalous |
| --- | --- | --- | --- |
| Process | aim.exe | aimrecover.exe | no |
| Query | QueryValue | QueryValue | no |
| Key | HKCU\Software\America Online\AOL Instant Messenger (TM) \CurrentVersion\Users\aimuser\Login\Password | HKCU\Software\America Online \AOL Instant Messenger (TM) \CurrentVersion\Users\aimuser\Login\Password | no |
| Response | SUCCESS | SUCCESS | no |
| Result Value | "BCOFHIHBBAHF" | "BCOFHIHBBAHF" | no |
| Process/Query | aim.exe:QueryValue | aimrecover:QueryValue | no |
| Query/Key | QueryValue:HKCU\Software\America Online\AOL Instant Messenger (TM)\CurrentVersion\Users\aimuser\Login\Password | QueryValue:HKCU\Software\America Online \AOL Instant Messenger (TM)\CurrentVersion\Users\aimuser\Login\Password | no |
| Response/Key | SUCCESS:HKCU\Software\America Online\AOL Instant Messenger (TM)\CurrentVersion\Users\aimuser\Login\Password | SUCCESS:HKCU\Software\America Online\AOL Instant Messenger (TM)\CurrentVersion\Users\aimuser\Login\Password | no |
| Process/Key | aim.exe:HKCU\Software\America Online\AOL Instant Messenger (TM)\CurrentVersion\Users\aimuser\Login\Password | aimrecover.exe:HKCU\Software\America Online\AOL Instant Messenger (TM)\CurrentVersion\Users\aimuser\Login\Password | yes |

In the exemplary embodiment, since there are five basic feature values, for each record, there are five first order consistency checks and 20 second order consistency checks of which five examples are given above. If the likelihood of any of the consistency checks is below a threshold, the record is labeled as anomalous. The determination of the threshold is described in greater detail below.

The manner in which the likelihoods for the first order ($P(X_i)$) consistency checks and the second order ($P(X_i|X_j)$) consistency checks are computed is described herein. From the normal data, there is a set of observed counts from a discrete alphabet, e.g., a finite number of distinct symbols or feature values, for each of the consistency checks. Computing the above likelihoods reduces to estimating a multinomial expression. In theory, the maximum likelihood estimate may be used, which computes the ratio of the counts of a particular element to the total counts. However, the maximum likelihood estimate has been found to be biased when relatively small amounts of data, e.g., "sparse data," are available. The distribution may be smoothed by adding a virtual count to each possible element. For anomaly detection, it is often desirable to take into account how likely it is to observe a previously unobserved element. Thus, if many different elements have been seen in the training data, it is therefore more likely to see additional, unobserved elements, as opposed to the case where very few elements have been seen, in which additional, unobserved elements would be unlikely. (The term "element" here refers to feature values, or a vector of feature values.)

To estimate the likelihoods, an estimator is used, which gives the following prediction for element i:

$$P(X = i) = \frac{\alpha + N_i}{k^0 \alpha + N} C \quad (1)$$

if element i was observed in the training data. If element i was not previously observed, then the following prediction is used:

$$P(X = i) = \frac{1}{L - k^0}(1 - C) \quad (2)$$

In these equations, the term $\alpha$ is a prior count for each element. The term $N_i$ is the number of times element i was observed; N is the total number of observations, $k^0$ is the number of different elements observed, and L is the total number of possible elements or the alphabet size. The parameters are either observed or computed (e.g., N and $k^0$ are determined by storing values and computing frequency counts) while L is defined by the particular system being modeled, i.e., the type of variables (e.g., 32 bit integers) defines a range of possible values. Thus, L is predefined by the implementation details of the system. Here, the system is modeling the Windows™ registry, which has a predefined range of possible values (as defined by the programmers of the registry.) The scaling factor C takes into account how likely it is to observe a previously observed element versus an unobserved element. C is computed by the following equation:

$$C = \left(\sum_{k=k^0}^{L} \frac{k^0 \alpha + N}{k\alpha + N} m_k \right) \left(\sum_{k \geq k^0} m_k \right)^{-1} \quad (3)$$

where $$m_k = P(S = k) \frac{k!}{(k - k^0)!} \frac{\Gamma(k\alpha)}{\Gamma(k\alpha + N)}$$

and $P(S=k)$ is a prior probability associated with the size of the subset of elements in the alphabet that have non-zero probability. Although the computation of C is expensive, it only needs to be done once for each consistency check at the end of training. Second order consistency checks are done in like fashion, except the particular values being measured are not distinct features values, but pairs of feature values, considering these pairs as a distinct element.

The prediction of the probability estimator is derived using a mixture of Dirichlet estimators, as are known in the art, see, e.g., the estimator presented in N. Friedman and Y. Singer, "Efficient Bayesian Parameter Estimation in Large Discrete Domains," *Advances in Neural Information Processing Systems* 11, MIT Press, which is incorporated by reference in its entirety herein.) The scores computed in the attached software code correspond to the estimates provided by the consistency checks in equations (1) and (2) above.

This exemplary embodiment of the algorithm labels every registry access as either normal or anomalous. Programs can have anywhere from just a few registry accesses to several thousand. This means that many attacks will be represented by large numbers of records where many of those records will be considered anomalous.

A second exemplary embodiment of the algorithm is described herein. Using the features that are monitored from each registry access, a score is computed to classify each access as either normal or malicious. A set of normal registry accesses are analyzed as a model of normal usage of the registry. Then using this model, new registry records are analyzed to determine whether or not they are malicious.

As the data is being collected, several important statistics are collected about each feature and the values that occur for each feature. For each feature, which values occurred for that feature and how many distinct values occurred for the feature, r, are recorded. Accordingly, r is a measure of how likely it is to see a new value for the feature. If many distinct values for a feature have been previously observed, i.e., a high value for r, and subsequently a never-observed value is encountered, such new value would be expected and considered normal. In contrast, if only a few distinct values have been observed, i.e., a low value for r, the observation of a new value is unlikely and possibly anomalous. The total number of registry different elements, e.g., training records, that are observed during training, n, is also recorded.

During training, for each of the features, all of the distinct observed values of the feature are stored, as well as the number of distinct observed values r. The total number of training records n is computed. For each feature, the algorithm computes p=r/n, which is an approximation of the probability of observing an unseen value for that feature in the normal data. To minimize storage requirements, instead of storing all distinct values, the algorithm hashes all of the values and stores the hashes of the values in a bit vector. More details on this technique is described in the implementation of PHAD (Packet Header Anomaly Detection), an anomaly detection algorithm known in the art, which was developed to detect anomalies in packet headers (see, e.g., M. Mahoney and P. Chan, "Detecting Novel Attacks by Identifying Anomalous Network Packet Headers," *Technical Report* CS-2001-2, Florida Institute of Technology, Melbourne, Fla., 2001).

Once the model has been trained, new registry accesses can be evaluated and a score computed to determine whether or not the registry accesses are abnormal. For a new registry access, we first extract the features for the registry access. For each of these features, a check is performed to see if the value of the feature has been observed for the feature. If the value has not been observed, a heuristic score is computed which determines the level of anomaly for that feature. The score is determined as 1/p for each feature. Intuitively this score will be higher for features where fewer distinct values have been observed. The final score for a registry access is the sum of the scores for each feature that observed a previously unobserved value. If this value is greater than a threshold, we label the registry access anomalous and declare the process that generated it as malicious. The results from this experiment are described below.

The basic architecture of the system 10 will now be discussed in greater detail herein. With continued reference to FIG. 1, the registry auditing module 12 monitors accesses to the registry. In the exemplary embodiment, the registry auditing module 12 is a "Basic Auditing Module" (BAM). In general, BAMs are known in the art, and implement an architecture and interface which provide a consistent data representation for a sensor. As indicated by arrow 22, they include a "hook" into the audit stream (in this case the registry) and various communication and data-buffering components. BAMs use an XML data representation substantially identical to the IETF standard for IDS systems (See, e.g., Internet Engineering Task Force. Intrusion detection exchange format. On-line publication, http://www.ietf.org/html.charters/idwg-charter.html, 2000.), minor syntatical differences. The registry auditing module 12 runs in the background on a Windows™ machine, where it gathers information on registry reads and writes, e.g., the 5 features discussed above. Registry auditing module 12 uses Win32 hooks to tap into the registry and log all reads and writes to the registry. The software uses an architecture substantially identical to SysInternal's Regmon (See, e.g., SysInternals. Regmon for Windows™ NT/9x. Online publication, 2000. http://www.sysinternals.com/ntw2k/source/regmon.shtml), and extracts a subset of data available to Regmon. After gathering the registry data, registry auditing module 12 can be configured for two distinct uses. One use is to act as the data source for model generation. When registry auditing module 12 is used as the data source for model generation, its output is sent to a database 18 (as indicated by arrow 24) where it is stored and later used by the model generator 16 described herein. The second use of registry auditing module 12 is to act as the data source for the real-time anomaly detector 14 described herein. While in this mode, the output of registry auditing module 12 is sent directly to the anomaly detector 14 (indicated by arrow 26) where it is processed in real time.

Figure 2:
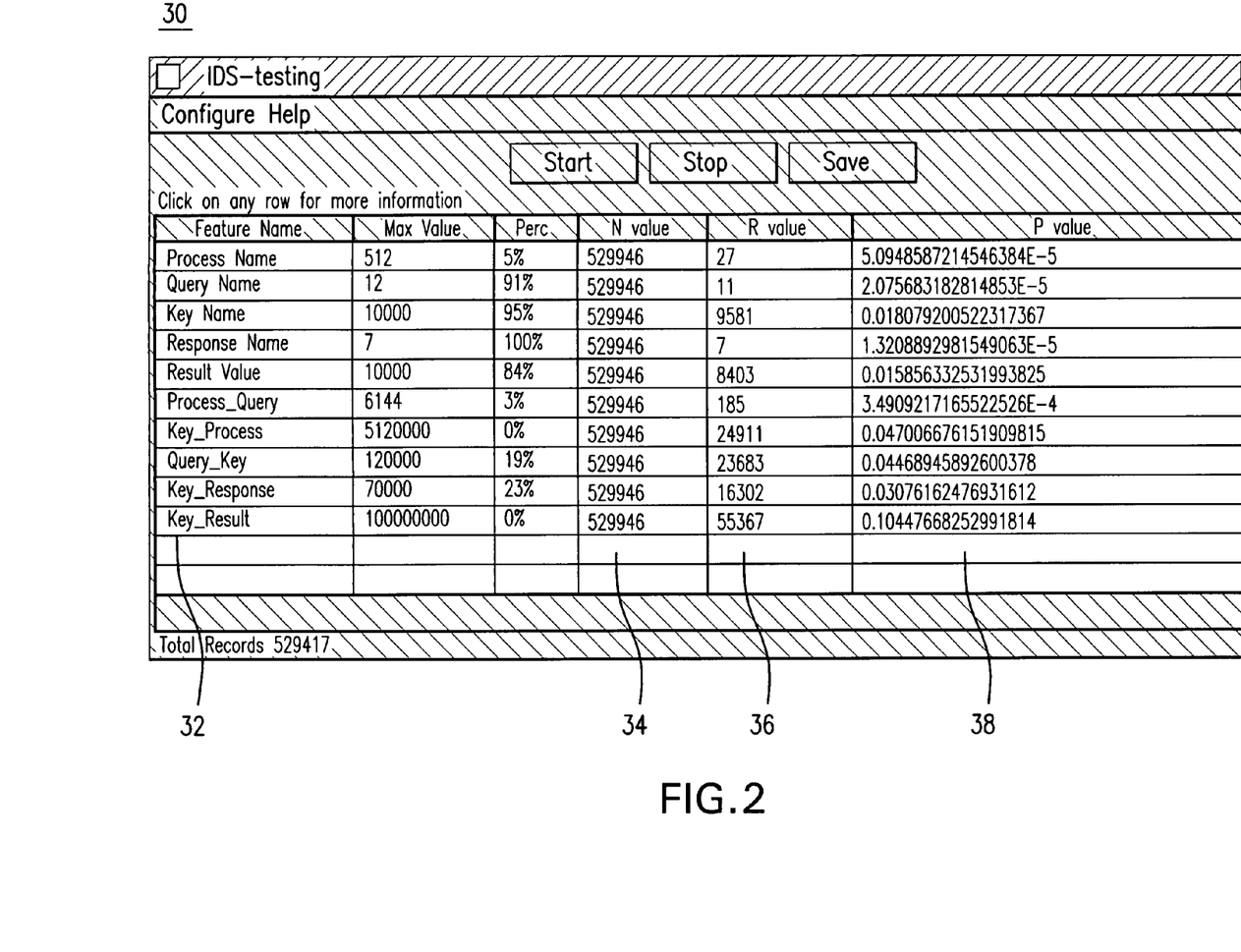
FIG. 2 is an exemplary user interface in accordance with the present invention.

The model generation infrastructure consists of two components. A database 18 is used to store all of the collected registry accesses from the training data. A model generator 14 then uses this collected data to create a model of normal usage. The model generator 14 uses one of the two exemplary algorithms discussed above (or other similar algorithm) to build a model that will represent normal usage. It utilizes the data stored in the database 18 which was generated by registry auditing module 12. The database 18 is described in greater detail is concurrently filed U.S. Application serial No. [not yet known], entitled "System and Methods for Adaptive Model Generation for Detecting Intrusion in Computer Systems," to Andrew Honig, et al., which is incorporated by reference in its entirety herein. (Arrow 28 indicates the flow of data from the data warehouse 18 to the model generator 14.) The model itself is comprised of serialized Java objects. This allows for a single model to be generated and to easily be distributed to additional machines. Having the model easily deployed to new machines is a desirable feature since in a typical network, many Windows™ machines have similar usage patterns which allow for the same model to be used for multiple machines. The GUI 30 for the model generator using the second embodiment of the algorithm is shown in FIG. 2. Column 32 indicates the feature name, column 34 indicates the n-value, column 36 indicates the r-value, and column 38 indicates the p-value. Additional details for generating a model are described in U.S. application Ser. No. 10/208,432 filed Jul. 30, 2002 entitled "System and Methods for Detection of New Malicious Executables," to Matthew G. Schulz et al., which is incorporated by reference in its entirety herein.

The anomaly detector 16 will load the normal usage model created by the model generator 14 (as indicated by arrow 29) and begin reading each record from the output data stream of registry auditing module 12 (arrow 26). One of the algorithms, as discussed above, is then applied against each record of registry activity. The score generated by the anomaly detection algorithm is then compared by a user configurable threshold to determine if the record should be considered anomalous. A list of anomalous registry accesses are stored and displayed as part of the detector.

The system described herein is a statistical model of expected registry queries and results. If an attacker wanted to usurp a host-based detector, they can a) turn off the detector at the host (and hope no alarms go off elsewhere) or b) they can attack the host based detector by changing its rules or changing its statistical model so it won't alarm.

Accordingly, in order to protect the statistical model of the system, from being attacked, it is put it in the registry. The registry is essentially a data base, and the statistical model comprises query values and probabilities. The evaluation of the model first accesses values and probability estimates. This information can be stored in the registry. Hence, any process that attempts to touch the model (for example, to change some values in the model) will be abnormal registry accesses and set off the alarm. Consequently, the system would be protected from having its own model being attacked since it will notice when it is under attack In order to evaluate the system, data was gathered by running a registry auditing module 12 on a host machine. During training, several programs were run in order to generate normal background traffic. In order to generate normal data for building an accurate and complete training model, it was important to run various applications in various ways. By examining registry traffic, it was discovered that it is not just which programs that are run, but also how they are run that affect registry activity. For example, running ping.exe from the command prompt does not generate registry activity. However, running ping.exe directly from the run dialog box does generate registry activity: By understanding such details of the registry, a more complete training model was built. Beyond the normal execution of standard programs, such as Microsoft™ Word, Internet Explorer, and Winzip, the training also included performing tasks such as emptying the Recycling Bin and using Control Panel.

The training data collected for the experiment was collected on Windows™ NT 4.0 over two days of normal usage. "Normal" usage is defined to mean what is believed to be typical use of a Windows™ platform in a home setting. For example, it was assumed that users would log in, check some internet sites, read some mail, use word processing, then log off. This type of session was taken to be relatively typical of computer users. Normal programs are those which are bundled with the operating systems, or are in use by most Windows™ users.

The simulated home use of Windows™ generated a clean (attack-free) dataset of approximately 500,000 records. The system was tested on a full day of test data with embedded attacks executed. This data was comprised of approximately 300,000 records, most of which were normal program executions interspersed with attacks among normal process executions. The normal programs run between attacks were intended to simulate an ordinary Windows™ session. The programs used were, for example, Microsoft™ Word™, Outlook Express™, Internet Explorer™, Netscape™, AOL™ Instant Messenger™.

The attacks run include publicly available attacks such as aimrecover, browslist, bok2ss (back orifice), install.exe xtxp and exe (both for backdoor.XTCP), 10phtcrack, runttack, whackmole, and setuptrojan. Attacks were only run during the one day of testing throughout the day. Among the twelve attacks that were run, four instances were repetitions of the same attack. Since some attacks generated multiple processes there are a total of seventeen distinct processes for each attack. All of the processes (either attack or normal) as well as the number of registry access records in the test data is shown in Table 3 and described in greater detail herein.

The training and testing environments were set up to replicate a simple yet realistic model of usage of Windows™ systems. The system load and the applications that were run were meant to resemble what one may deem typical in normal private settings.

The first exemplary anomaly detection algorithm discussed above in equations (1)-(3) were trained over the normal data. Each record in the testing set was evaluated against this training data. The results were evaluated by computing two statistics: the detection rate and the false positive rate. The performance of the system was evaluated by measuring detection performance over processes labeled as either normal or malicious.

Figure 3:
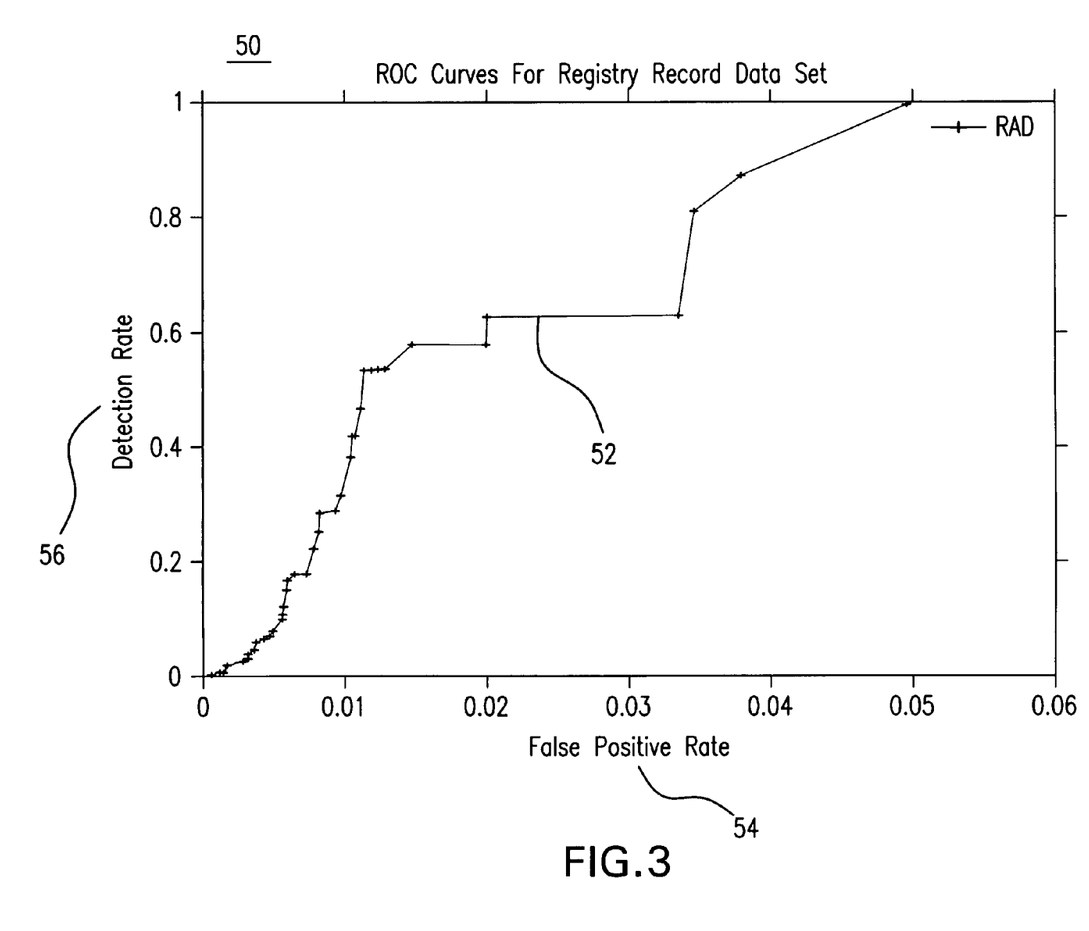
FIG. 3 is a plot illustrating the result of an embodiment of the present invention.

The detection rate reported below is the percentage of records generated by the malicious programs which are labeled correctly as anomalous by the model. The false positive rate is the percentage of normal records which are mislabeled anomalous. Each attack or normal process has many records associated with it. Therefore, it is possible that some records generated by a malicious program will be mislabeled even when some of the records generated by the attack are accurately detected. This will occur in the event that some of the records associated with one attack are labeled normal. Each record is given an anomaly score, S, that is compared to a user defined threshold. If the score is greater than the threshold, then that particular record is considered malicious. FIG. 3 shows how varying the threshold affects the output of detector. The actual recorded scores plotted in the figure are displayed in Table 2.

TABLE 2

| Threshold Score | False Positive Rate | Detection Rate |
| --- | --- | --- |
| 6.847393 | 0.001192 | 0.005870 |
| 6.165698 | 0.002826 | 0.027215 |
| 5.971925 | 0.003159 | 0.030416 |
| 5.432488 | 0.004294 | 0.064034 |
| 4.828566 | 0.005613 | 0.099253 |
| 4.565011 | 0.006506 | 0.177161 |
| 3.812506 | 0.009343 | 0.288687 |
| 3.774119 | 0.009738 | 0.314301 |
| 3.502904 | 0.011392 | 0.533084 |
| 3.231236 | 0.012790 | 0.535219 |
| 3.158004 | 0.014740 | 0.577908 |
| 2.915094 | 0.019998 | 0.578442 |
| 2.899837 | 0.020087 | 0.627001 |
| 2.753176 | 0.033658 | 0.629136 |
| 2.584921 | 0.034744 | 0.808431 |
| 2.531572 | 0.038042 | 0.869797 |
| 2.384402 | 0.050454 | 1.000000 |

Table 3 is sorted in order to show the results for classifying processes. Information about all processes in testing data including the number of registry accesses and the maximum and minimum score for each record as well as the classification. The top part of the table shows this information for all of the attack processes and the bottom part of the table shows this information for the normal processes. The reference number (by the attack processes) give the source for the attack. Processes that have the same reference number are part of the same attack. [1] AIMCrack. [2] Back Orifice. [3] Backdoor.xtcp. [4] Browse List. [5] Happy 99. [6] IPCrack. [7] LOpht Crack. [8] Setup Trojan.

TABLE 3

| Program Name | Number of Records | Maximum Record Value | Minimum Record Value | Classification |
| --- | --- | --- | --- | --- |
| LOADWC.EXE[2] | 1 | 8.497072 | 8.497072 | ATTACK |
| ipccrack.exe[6] | 1 | 8.497072 | 8.497072 | ATTACK |
| mstinit.exe[2] | 11 | 7.253687 | 6.705313 | ATTACK |
| bo2kss.exe[2] | 12 | 7.253687 | 6.62527 | ATTACK |
| runonce.exe[2] | 8 | 7.253384 | 6.992995 | ATTACK |
| browselist.exe[4] | 32 | 6.807137 | 5.693712 | ATTACK |
| install.exe[3] | 18 | 6.519455 | 6.24578 | ATTACK |
| SetupTrojan.exe[8] | 30 | 6.444089 | 5.756232 | ATTACK |
| AimRecover.exe[1] | 61 | 6.444089 | 5.063085 | ATTACK |
| happy99.exe[5] | 29 | 5.918383 | 5.789022 | ATTACK |
| bo2k_1_0_intl.e[2] | 78 | 5.432488 | 4.820771 | ATTACK |
| _INS0432._MP[2] | 443 | 5.284697 | 3.094395 | ATTACK |
| xtcp.exe[3] | 240 | 5.265434 | 3.705422 | ATTACK |
| bo2kcfg.exe[2] | 289 | 4.879232 | 3.520338 | ATTACK |
| 10phtcrack.exe[7] | 100 | 4.688737 | 4.575099 | ATTACK |
| Patch.exe[2] | 174 | 4.661701 | 4.025433 | ATTACK |
| bo2k.exe[2] | 883 | 4.386504 | 2.405762 | ATTACK |
| systray.exe | 17 | 7.253687 | 6.299848 | NORMAL |
| CSRSS.EXE | 63 | 7.253687 | 5.031336 | NORMAL |
| SPOOLSS.EXE | 72 | 7.070537 | 5.133161 | NORMAL |
| ttssh.exe | 12 | 6.62527 | 6.62527 | NORMAL |
| winmine.exe | 21 | 6.56054 | 6.099177 | NORMAL |

TABLE 3-continued

| Program Name | Number of Records | Maximum Record Value | Minimum Record Value | Classification |
|---|---|---|---|---|
| em_exec.exe | 29 | 6.337396 | 5.789022 | NORMAL |
| winampa.exe | 547 | 6.11399 | 2.883944 | NORMAL |
| PINBALL.EXE | 240 | 5.898464 | 3.705422 | NORMAL |
| LSASS.EXE | 2299 | 5.432488 | 1.449555 | NORMAL |
| PING.EXE | 50 | 5.345477 | 5.258394 | NORMAL |
| EXCEL.EXE | 1782 | 5.284697 | 1.704167 | NORMAL |
| WINLOGON.EXE | 399 | 5.191326 | 3.198755 | NORMAL |
| rundll32.exe | 142 | 5.057795 | 4.227375 | NORMAL |
| explore.exe | 108 | 4.960194 | 4.498871 | NORMAL |
| netscape.exe | 11252 | 4.828566 | −0.138171 | NORMAL |
| java.exe | 42 | 4.828566 | 3.774119 | NORMAL |
| aim.exe | 1702 | 4.828566 | 1.750073 | NORMAL |
| findfast.exe | 176 | 4.679733 | 4.01407 | NORMAL |
| TASKMGR.EXE | 99 | 4.650997 | 4.585049 | NORMAL |
| MSACCESS.EXE | 2825 | 4.629494 | 1.243602 | NORMAL |
| IEXPLORE.EXE | 194274 | 4.628190 | −3.419214 | NORMAL |
| NTVDM.EXE | 271 | 4.59155 | 3.584417 | NORMAL |
| CMD.EXE | 116 | 4.579538 | 4.428045 | NORMAL |
| WINWORD.EXE | 1541 | 4.457119 | 1.7081 | NORMAL |
| EXPLORER.EXE | 53894 | 4.31774 | −1.704574 | NORMAL |
| msmsgs.exe | 7016 | 4.177509 | 0.334128 | NORMAL |
| OSA9.EXE | 705 | 4.163361 | 2.584921 | NORMAL |
| MYCOME 1.EXE | 1193 | 4.035649 | 2.105155 | NORMAL |
| wscript.exe | 527 | 3.883216 | 2.921123 | NORMAL |
| WINZIP32.EXE | 3043 | 3.883216 | 0.593845 | NORMAL |
| notepad.exe | 2673 | 3.883216 | 1.264339 | NORMAL |
| POWERPNT.EXE | 617 | 3.501078 | −0.145078 | NORMAL |
| AcroRd32.exe | 1598 | 3.412895 | 0.393729 | NORMAL |
| MDM.EXE | 1825 | 3.231236 | 1.680336 | NORMAL |
| ttermpro.exe | 1639 | 2.899837 | 1.787768 | NORMAL |
| SERVICES.EXE | 1070 | 2.576196 | 2.213871 | NORMAL |
| REGMON.EXE | 259 | 2.556836 | 1.205416 | NORMAL |
| RPCSS.EXE | 4349 | 2.250997 | 0.812288 | NORMAL |

The process of setting the threshold is described herein. If the threshold is set at 8.497072, the processes LOADWC.EXE and ipccrack.exe are labeled as malicious and would detect the Back Orifice and IPCrack attacks. Since none of the normal processes have scores that high, we would have no false positives. If we lower the threshold to 6.444089, we would have detected several more processes from Back Orifice and the BrowseList, BackDoor.xtcp, SetupTrojan and AimRecover attacks. However, at this level of threshold, the following processes would be labeled as false positives: systray.exe, CSRSS.EXE, SPOOLSS.EXE, ttssh.exe, and winmine.exe.

By varying the threshold for the inconsistency scores on records, we were able to demonstrate the variability of the detection rate and false positive rate. The false positive rate versus the detection rate was plotted in an ROC (Receiver Operator Characteristic) curve 52 shown in Table 2 and the plot 50 in FIG. 3, in which the false positive rate 54 is plotted against the detection rate 56.

Another exemplary embodiment is described herein. The systems and method described above, uses Windows™ registry accesses, which is an example of a general means of detecting malicious uses of a host computer. However, other systems, such as Linux/Unix, do not use a registry. In those cases, a file system sensor would be used. Accesses to the file system provides an audit source of data (i.e., whenever an application is run, any and all things accessed are files, e.g., the main executable files are accessed, and the project files are accessed). This audit source can be observed, and a "normal baseline model" built, and then used for detecting abnormal file system accesses.

It will be understood that the foregoing is only illustrative of the principles of the invention, and that various modifications can be made by those skilled in the art without departing from the scope and spirit of the invention.

APPENDIX

The software listed herein is provided in an attached CD-Rom. The contents of the CD-Rom are incorporated by reference in their entirety herein.

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

PAD (Probabilistic Anomaly Detection) is a package that detects anomalies in fixed length records of discrete values.

The basic idea behind PAD is that it trains over a data set and then checks to see if new observed records are "consistent" with the data set. There are two types of consistency checks. First order consistency checks evaluate whether or not a single feature is consistent with other features in the dataset. Second order consistency checks evaluate if a pair of features is consistent with the data set. All consistency checks are evaluated by computing a predictive probability. This is done by estimating a multinomial using counts observed from the data set and then estimating the probability of seeing the observation.

Let us assume records of length n are being observed. That is, each record can be written as a set of random variables $(X\_1, X\_2, \ldots, X\_n)$. Each first order consistency check can be denoted as computing $P(X\_i)$. This probability is trained over a data set, and then used to predict elements in another dataset. These two datasets can be in fact the same. To train the probability distribution, the counts of the observed symbols in the data set are collected. The second order consistency checks are $P(X\_i, X\_j)$. In this case, the counts of $X\_i$ are collected when $X\_j$ is observed. Note that there is a separate set of counts for each $X\_j$. Accordingly, second order consistency checks take a significant amount of memory relative to first order consistency checks.

All of these probability estimates are obtained using the multinomial estimator presented in Friedman, Singer 1999 (incorporated by reference, above). The basic idea of the estimator is that it explicitly takes into account the probability of seeing an unobserved symbol.

The term C is the probability of observing an already observed symbol. Thus (1−C) is the probability of observing an unobserved symbol. For the observed symbols, a Dirichlet is used to estimate the probabilities for the counts. If N is the total number of observations, and N_i is the observations of symbol i, if alpha is the "pseudo count" which is added to the count of each observed symbol, and k^0 is the number of observed symbols and L is the total number of symbols, the probability is as follows:

For an observed symbol i, the probability is: C((N_i+alpha)/(k^0*alpha+N)) For an unobserved symbol, the probability is: (1−C)*(1/(L−k^0)). See equations (1) and (2) above, and the routine "updateC" in Classifier.c. In the second case, the probability is spread among possible unobserved symbols.

Since each feature in the record may have a different set of possible outcomes, if P is the probability estimated from the consistency check, the following term is reported: log(P/(1/L)). This normalizes the consistency check to take into account the number of possible outcomes L. In general, C should be set as described in Friedman, Singer 1999.

However, this causes some overflow/underflow problems in the general case. Instead, the current version of the algorithm uses a heuristic to set C. This is done after observing the counts. This is called SIMPLE_MODE in the implementation. In SIMPLE_MODE, C is set to C=N/(N+L−k^0). In addition, in SIMPLE_MODE, there is a variable OBSERVED_BIAS which adjusts the value of C toward observed or unobserved symbols. When OBSERVED_BIAS=0.0, there is no bias. Positive values increase the probability mass of observed symbols while negative values decrease the probability mass of unobserved symbols. For non-zero OBSERVED_BIAS, the value of C is adjusted so that the new value of C, C* is given as follows C*=C/(C+((1−C)*exp(−OBSERVED_BIAS))).

Package Installation and Quick Start: To install the package, the following steps should be performed:
1. Unpack the files.
2. cd into the src/subdirectory.
3. type make To test the package, the following steps should be performed:
4. cd into data/subdirectory
5. type ./src/pad -e -g globalsFile.txt -p sampleInput.txt sampleInput.txt Subsequently, the following output should be provided:

The next steps are then performed:
6. Type ./src/pad -e -g globalsFile.txt -w temp.cla sampleInput.txt This should create a file called temp.cla which is the trained model (classifier) from the sample input.
7. Type ./src/pad -r -p sampleInput.txt temp.cla This should provide the same output as above.

Usage Instructions The executable has two modes: "examples" mode (using the -e option) which reads in examples from a file and trains the model using that data, and "read" mode (using the -r option) which reads in a model from a file. The executable requires one argument, which is either the file or examples. The globals file (specified with the -g option) defines all of the global variables. These include the number of columns, the file names containing the column symbol definitions. Note that when reading in a model, the column symbol files must be in the current directory.

Options: Command line options: In addition to -r and -e which set the mode, the following are options that can be used from the command line:

| -g FILE | set globals file |
| -v | toggle verbose output |
| -s | toggle use of second order predictors |
| -w FILE | write classifier to file. |
| -p FILE | predict files |

Globals File Options: Below is the globals file included in the distribution. All lines starting with "#" are comments.

```
# Globals Definition
#The input Symbols.
NUM_COLUMNS 4
#Set Simple Mode
SIMPLE_MODE TRUE
#Set Use Second Order Consistency Checks
USE_SECOND_ORDER TRUE
#Set Verbose mode
VERBOSE FALSE
#Allow unknown symbols in testing
ALLOW_UNKNOWN_SYMBOLS TRUE
#Set Initial Count for Predictors. This is the virtual count
#that is added to all observed symbols.
INITIAL_PREDICTION_COUNT 1
#Set the bias to observed symbols
OBSERVED_BIAS 0.0
#Set the Column Symbol Files
COLUMN_SYMBOL_FILENAME 1:C1.txt
COLUMN_SYMBOL_FILENAME 2:C2.txt
COLUMN_SYMBOL_FILENAME 3:C3.txt
``` a aa aaa zzzz: 0.031253 1.386294 0.490206 0.693147 0.000000 0.031253 0.000000 0.000000 0.000000 1.386294 0.980829 0.980829 0.000000 0.490206 0.693147 0.693147 0.000000 0.693147 0.875469 0.875469: test
b aa fff dddd: 0.436718 1.386294 0.202524 0.000000 0.619039 0.436718 0.000000 0.000000 0.632523 1.386294 0.632523 0.000000 0.000000 0.202524 0.470004 0.000000 −0.000000 0.000000 −0.000000 0.000000: test1
c aa fff tttt: 0.031253 1.386294 0.202524 0.000000 0.000000 0.031253 0.000000 0.000000 0.000000 1.386294 0.632523 0.000000 0.000000 0.202524 0.470004 0.000000 0.000000 0.000000 −0.000000 0.000000: test2
g aa aaa zzzz: 0.031253 1.386294 0.490206 0.693147 0.000000 0.031253 0.000000 0.000000 0.000000 1.386294 0.980829 0.980829 0.000000 0.490206 0.693147 0.693147 0.000000 0.693147 0.875469 0.875469: test3
b aa aaa zzzz: 0.436718 1.386294 0.490206 0.693147 0.619039 0.436718 0.000000 0.000000 0.632523 1.386294 0.980829 0.980829 0.000000 0.490206 0.693147 0.693147 −0.000000 0.693147 0.875469 0.875469: test4

```
COLUMN_SYMBOL_FILENAME 4:C4.txt
#Sets the number of symbols in a column
COLUMN_NUM_SYMBOLS 1:40
#Sets the classifier to ignore a column
IGNORE_COLUMN 2
#Sets the symbol that represents an ignored symbol
IGNORE_SYMBOL **
#Sets the symbol to represent an unknown symbol
UNKNOWN_SYMBOL UKS
```

Input file description: Each line of the input file corresponds to a record. Each record consists of the features in a record separated by a space. This is followed by a tab after which there is an optional comment. This comment is preserved in prediction and can be used in experiments to keep track of the type of a record and where it came from. Below is the sample input:

| | |
|---|---|
| a aa aaa zzzz | test |
| b aa fff dddd | test1 |
| c aa fff tttt | test2 |
| g aa aaa zzzz | test3 |
| b aa aaa zzzz | test4 |

A symbol file defines all of the possible symbols. Each symbol is on a separate line in the file. A sample symbol file is below:

```
aaa
ccc
fff
ggg
```

There are several options related to symbol files. The IGNORE_COLUMN can set the classifier to ignore a column completely. In this case, each element of the column gets mapped to a special symbol which is ignored in the model. In a single record, some of the fields can be set to a special symbol (by default "**") which tells the classifier to ignore its value. A special symbol (by default "UKS") denotes an unknown symbol. In training, unknown symbols are not allowed and will cause the program to exit. In testing, the unknown symbols are treated as if it is a symbol that has observed count of 0. The option ALLOW_UNKNOWN_SYMBOLS toggles the automatic mapping of unseen symbols to the special unknown symbol during testing. This makes running experiments easier because it is not necessary to have the symbol files contain the data in the test set.

Package Description The software package contains the following:

| | |
|---|---|
| /src/ | directory consisting of all of the source files |
| /data/ | directory consisting of a small sample input |
| /registry/ | directory consisting of data and scripts to do the registry experiments. |
| /papers/ | directory containing relevant papers to pad. |

In the/src/directory there are the following files:

| | |
|---|---|
| Classifier.c | File that defines the Classifier (model) |
| Classifier.h | Header file for Classifier.c |
| Column.c | File that defines a single consistency check |
| Column.h | Header file for Column.c |
| Globals.c | Defines the global variables |
| Globals.h | Header file for Globals.c |
| HashTable.c | Hashtable implementation |
| HashTable.h | Header file for Hashtable.c |
| includes.h | Include file for all files |
| Input.c | Implementation of I/O |
| Input.h | Header file for Input.c |
| Makefile | Makefile |
| memwatch.c | Package to detect memory leaks |
| memwatch.h | Package to detect memory leaks |
| pad.c | Main executable file |
| pad.h | Header file for pad.c |
| SymbolTable.c | Symbol Table implementation for mapping Symbols to Integers |
| SymbolTable.h | Header file for SymbolTable.c |

Registry Experiments: The following steps should be performed:

1. cd registry/
2. type . ./src/pad -e -g regGlobs.txt -w model.cla registry.txt
This creates a file called model.cla which is the model that is trained on 800 k registry records. It should take about 190 MB of memory to train the model.
3. type . ./src/pad -r -p registry.txt model.cla>predictions.txt
This reads in the model and evaluates all of the records. The file predictions.txt contains the values for all of the consistency checks.
4. Type . /computeResults.pl predictions.txt>final-predictions.txt
This determines the minimum value for a consistency check for each record and puts on each line this value and the comment.
5. Type sort -n final-predictions.txt>sorted-final-predictions.txt
This sorts the records in order of least consistent. This is the final output of the experiments.
6. Type ./computeROC.pl sorted-final-predictions.txt>roc.txt
This computes ROC points for the experiments.

We claim:

1. A method for detecting intrusions in the operation of a computer system comprising:
   (a) gathering features from records of normal processes that access the file system of the computer;
   (b) generating a probabilistic model of normal computer system usage based on occurrences of the features and determining the likelihood of observing an event that was not observed during the gathering of features from the records of normal processes; and
   (c) analyzing features from a record of a process that accesses the file system to detect deviations from normal computer system usage to determine whether the access to the file system is an anomaly.

2. The method according to claim 1, wherein the step of gathering features from records of normal processes that access the file system of the computer comprises gathering a feature corresponding to a name of a process accessing the file system of the computer.

3. The method according to claim 1, wherein gathering features from records of normal processes that access the file system of the computer comprises gathering a feature corresponding to a type of query being sent to the file system of the computer.

4. The method according to claim 3, wherein gathering features from records of normal processes that access the file system of the computer comprises gathering a feature corresponding to an outcome of a query being sent to the file system of the computer.

5. The method according to claim 1, wherein gathering features from records of normal processes that access the file system of the computer comprises gathering a feature corresponding to a name of a key being accessed in the file system of the computer.

6. The method according to claim 5, wherein gathering features from records of normal processes that access the file system of the computer comprises gathering a feature corresponding to a value of the key being accessed.

7. The method according to claim 1, wherein generating a probabilistic model of normal computer system usage comprises determining a likelihood of observing a feature in the records of processes that access the file system of the computer.

8. The method according to claim 7, wherein determining a likelihood of observing a feature comprises determining a conditional probability of observing a first feature in the records of processes that access the file system of the computer given an occurrence of a second feature is the records.

9. The method according to claim 1, wherein analyzing a record of a process that accesses the file system of the computer comprises, for each feature, performing a check to determine if a value of the feature has been previously observed for the feature.

10. The method according to claim 9, further comprising, if the value of the feature has not been observed, computing a score based on a probability of observing the value of the feature.

11. The method according to claim 9, further comprising, if the score is greater than a predetermined threshold, labeling the access to the file system of the computer as anomalous and labeling the process that accessed the file system of the computer as malicious.

* * * * *